# United States Patent [19]

Schmitt

[11] Patent Number: 4,487,837
[45] Date of Patent: Dec. 11, 1984

[54] RADIATION METHOD FOR DETERMINING BRINE TOLERANT SURFACTANTS IN COMPLEX MIXTURES

[75] Inventor: Kirk D. Schmitt, Pennington, N.J.

[73] Assignee: Mobil Oil Corporation, New York, N.Y.

[21] Appl. No.: 329,479

[22] Filed: Dec. 10, 1981

[51] Int. Cl.³ .............................................. E21B 43/20
[52] U.S. Cl. ....................................... 436/27; 436/29; 166/247
[58] Field of Search ...................... 436/57, 56, 119, 79, 436/27, 29; 166/247, 275

[56] References Cited

U.S. PATENT DOCUMENTS

| | | | |
|---|---|---|---|
| 3,560,158 | 2/1971 | Benson | 436/57 |
| 4,231,426 | 11/1980 | Carter et al. | 166/275 |
| 4,242,186 | 12/1980 | Moran et al. | 436/56 |
| 4,299,711 | 11/1981 | Tyler et al. | 166/275 |

FOREIGN PATENT DOCUMENTS

| | | | |
|---|---|---|---|
| 2543239 | 5/1976 | Fed. Rep. of Germany | 166/275 |
| 2853470 | 6/1979 | Fed. Rep. of Germany | 166/275 |

OTHER PUBLICATIONS

Nucleonics, 3/58, vol. 16, pp. 62-67.

*Primary Examiner*—Hiram H. Bernstein
*Attorney, Agent, or Firm*—Alexander J. McKillop; Michael G. Gilman; Charles J. Speciale

[57] ABSTRACT

This invention provides a method for determining the concentration of a brine tolerant sulfonate surfactant in a complex mixture containing, in addition to said brine tolerant sulfonate surfactant, lignosulfonates, crude oil, salts, and water and, optionally, petroleum sulfonates and alcohols, that comprises incorporating into the brine tolerant sulfonate surfactant molecule a small amount of tritium prior to addition to the complex mixture and determining the concentration of the brine tolerant sulfonate surfactant by measuring its radioactivity.

1 Claim, No Drawings

RADIATION METHOD FOR DETERMINING BRINE TOLERANT SURFACTANTS IN COMPLEX MIXTURES

BACKGROUND OF THE INVENTION

1. Field of the Invention

This invention is concerned with a method for determining the concentration of brine tolerant surfactants in complex water flood mixtures.

2. Description of the Prior Art

The existence of radioactivity in the tritium isotope of hydrogen and sensitive means for quantifying the tritium content of a molecule are well known.

Tritium labelling has been used as a probe to determine the molecular mechanisms of reactions. In such use, the goals have been to determine if the tritium has remained in the molecule and, if so, where in the molecule it may be found. Tritium labelling has been used to determine concentration and follow the flow of biological materials in biological systems.

Insofar as is now known, the incorporation of tritium in a brine tolerant surfactant molecule to allow selective detection and determination of small amounts of the surfactant in a complex mixture has not been proposed.

SUMMARY OF THE INVENTION

This invention provides a method for determining the concentration of a brine tolerant sulfonate surfactant in a complex mixture containing, in addition to said brine tolerant sulfonate surfactant, lignosulfonates, crude oil, salts, and water and, optionally, petroleum sulfonates and alcohols, that comprises incorporating into the brine tolerant sulfonate surfactant molecule a small amount of tritium prior to addition to the complex mixture and determining the concentration of the brine tolerant sulfonate sulfactant by measuring its radioactivity.

DESCRIPTION OF SPECIFIC EMBODIMENTS

The brine tolerant sulfonate surfactants contemplated herein are compounds having the formula $R-(OC_2H_4)_n-OCH_2CH_2CH_2SO_3M$, wherein R is alkyl having between about 10 carbon atoms and about 30 carbon atoms, n is 2-6, and M is an alkali metal. When the R group is a straight, i.e., normal, chain a cosurfactant must be used, e.g., an alkanol.

A preferred class of brine tolerant sulfonate surfactants is disclosed in now abandoned application Ser. No. 259,216, filed Apr. 30, 1981, which is incorporated herein in its entirety by reference. That application describes surfactants in which R is branched chain, i.e., two-tailed. These brine tolerant surfactants are effective at low concentrations, between about 0.001 weight percent and about one weight percent.

In order to optimize the performance of these brine tolerant surfactants in low tension waterflood operations, it is necessary to know the concentration of the brine tolerant surfactant. These surfactants are expensive components of enhanced oil recovery fluids and it is important that neither too much nor too little surfactant will be used.

Standard methods of analysis for surfactants, such as dye titration, are adequate for simple fluids containing a single sulfonate, but fail in complex systems because they are nonselective and give only total sulfonate concentrations. Methods based on high pressure liquid chromatographic separation fail for several reasons. There may be no way to separate the brine tolerant surfactant from the other components or the brine tolerant surfactant may not have a sufficiently strong UV chromaphore to render its easy detection by UV. The low concentration of surfactant in produced fluids makes impractical other high pressure liquid chromatographic detection techniques, such as refractive index or electrochemistry.

The synthetic procedures for incorporating tritium into organic molecules are well known. They include reduction of double or triple bonds by tritium-containing hydrogen gas over heterogeneous catalysts; scrambling of carbon-hydrogen bonds over similar catalysts; reduction of carbonyl or other unsaturated functional groups by tritium-containing hydrides; acid catalyzed exchange of tritium for hydrogen on aromtic rings; and base catalyzed exchange of tritium for hydrogen on acidic carbons. The particular method used to incorporate tritium into the brine tolerant surfactant molecule is not a critical factor in the method of this invention.

The brine tolerant surfactants are expensive components of enhanced oil recovery fluids used in waterflood operations. In addition, other components are often present in aqueous oil recovery fluids including sacrificial agents, such as petroleum sulfonates and lignosulfonates; thickeners, such as polymers; cosurfactants, such as alcohols used when R is straight chain alkyl; brine components, such as sodium chloride, calcium chloride, and magnesium chloride; and crude oil.

No component of such a complex mixture will exhibit radioactivity except the tritium labelled brine tolerant surfactant. In accordance with the method of this invention, the concentration of brine tolerant surfactant having tritium incorporated into its molecule present in a recovered waterflood fluid is readily determined by measuring its radioactivity. Any of the well known techniques for such measurements can be used, such as with a scintillometer.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for controlling the concentration of a brine tolerant sulfonate surfactant in a recovered complex fluid mixture containing, in addition to said sulfonate surfactant, lignosulfonates, crude oil, salts and water and, optionally, petroleum sulfonates and alcohols, that comprises: (1) incorporating into the sulfonate surfactant molecule a small amount of tritium prior to addition of the complex mixture, (2) adding the tritium modified surfactant to said complex mixture, (3) determining the concentration of the brine tolerant sulfonate surfactant in recovered complex mixture fluid by measuring its radioactivity and (4) optimizing the concentration of the brine tolerant sulfonate in said recovered complex mixture in response to the determined concentration of the tritium incorporated sulfonate therein by adding neither too much nor too little brine tolerant sulfonate to said complex mixture.

* * * * *